United States Patent [19]

Grover et al.

[11] Patent Number: 5,442,441
[45] Date of Patent: Aug. 15, 1995

[54] RADIO FREQUENCY EXCITED RING LASER GYRO

[75] Inventors: Bruce C. Grover, Newbury Park; Tae W. Hahn, Chatsworth, both of Calif.

[73] Assignee: Litton Systems, Inc., Woodland Hills, Calif.

[21] Appl. No.: 776,929

[22] Filed: Oct. 15, 1991

Related U.S. Application Data

[63] Continuation-in-part of Ser. No. 253,094, Sep. 22, 1988, Pat. No. 5,305,085, Ser. No. 115,018, Oct. 28, 1987, Pat. No. 5,386,288, and Ser. No. 517,644, Apr. 6, 1990, Pat. No. 5,196,905, which is a continuation of Ser. No. 218,405, Jun. 22, 1988, abandoned.

[51] Int. Cl.⁶ .......................... H01S 3/05; G01B 9/02; G01C 19/64
[52] U.S. Cl. ........................ 356/350; 372/94
[58] Field of Search ........................ 356/350; 372/94

[56] References Cited

U.S. PATENT DOCUMENTS

| | | |
|---|---|---|
| 3,395,367 | 7/1968 | Bell et al. |
| 3,575,667 | 4/1971 | Smith ..................... 331/94.5 |
| 3,741,657 | 6/1973 | Andriga ..................... 356/350 |
| 3,772,611 | 11/1973 | Smith ..................... 331/94.5 |
| 3,800,244 | 3/1974 | Karras ..................... 331/94.5 |
| 3,815,047 | 6/1974 | Smith ..................... 331/94.5 |
| 3,873,884 | 3/1975 | Gabriel ..................... 315/267 |
| 4,031,428 | 6/1977 | Tokudome ..................... 315/111 |
| 4,031,428 | 6/1977 | Tokudome et al. ..................... 372/88 |
| 4,114,114 | 9/1978 | Pressley et al. ..................... 331/94.5 |
| 4,213,705 | 7/1980 | Sanders ..................... 356/350 |
| 4,470,701 | 9/1984 | Smith ..................... 356/350 |
| 4,475,199 | 10/1984 | Sanders ..................... 372/37 |
| 4,482,249 | 11/1984 | Smith et al. ..................... 356/350 |
| 4,522,496 | 6/1985 | Sanders ..................... 356/350 |
| 4,578,793 | 3/1986 | Kane et al. ..................... 372/94 |
| 4,596,018 | 6/1986 | Gruber et al. ..................... 372/61 |
| 4,616,929 | 10/1986 | Bernelin et al. ..................... 356/350 |
| 4,687,331 | 8/1987 | Holtz et al. ..................... 356/350 |
| 4,705,398 | 11/1987 | Lim et al. ..................... 372/94 |
| 4,747,111 | 5/1988 | Trunta et al. ..................... 372/94 |
| 4,813,774 | 3/1989 | Dorschner ..................... 350/622 |
| 4,818,087 | 4/1989 | Dorschner . |
| 5,196,905 | 4/1990 | Hahn et al. ..................... 356/350 |
| 5,305,085 | 4/1994 | Hahn ..................... 356/350 |

OTHER PUBLICATIONS

Properties of Zeeman Multioscillators Ring V. Sanders, 1979 Proceedings IEEE, 1449, Aug. 1979.
Waveguide Gas Laser, by P. W. Smith p. 132, vol. 19, No. 5 Applied Physics Letters Sep. 1, 1971.
Coaxial Resonators with Helicalinner Conductor W. W. Macalpin, Dec. 1959 IRE Proceedings.
Discussion of Multioscillator Laser Gyro Chow, et al, pp. 918–936 IEEE Journal of Quantum Electronics vol. QE–16 No. 9 Pub. Sep. 1980.

*Primary Examiner*—Nelson Moskowitz
*Attorney, Agent, or Firm*—Chester E. Martine, Jr.; James F. Kirk; L. David Rish

[57] ABSTRACT

Apparatus for stabilizing the position of the exciting electric component of a radio frequency electromagnetic field within the excited plasma of a ring laser, using two adjacent quarterwave coils, and driving the coils from a radio frequency source to ensure that the adjacent open ends of the two coils have electric field components that produce a steep gradient of electric field within the gas plasma of the ring laser.

20 Claims, 3 Drawing Sheets

RADIO FREQUENCY EXCITED RING LASER GYRO

This application is a Continuation in Part of U.S. patent application Ser. No. 07/517,644 which is assigned to Litton Systems, Inc of Woodland Hills, Calif. The 07/517,644 application was filed Apr. 6, 1990, and issued as U.S. Pat. No. 5,196,905 on Mar. 23, 1993 for a "Radio Frequency Excited Ring Laser Gyroscope" to Tae W. Hahn and Salim N. Jabr and has a common assignee. The 07/517,644 application was a Continuation of Ser. No. 07/218,405 which was filed on Jun. 22, 1988, had a common assignee and is now abandoned. The 07/218,405 application will be referred to as "Parent 1".

This patent application is also a Continuation in Part of U.S. patent application Ser. No. 07/253,094 which was filed Sep. 22, 1988 by Tae W. Hahn and which has a common assignee. The 07/253,094 application issued as U.S. Pat. No. 5,305,085 on Apr. 19, 1994 for a "Radio Frequency Excited Ring Laser Gyroscope With Common Induction Coil". Application Ser. No. 07/253,094 will be referred to herein as "Parent 2".

This patent application is also a Continuation in Part of application Ser. No. 07/115,018 which was filed on Oct. 28, 1987 by Graham Martin and which has a common assignee. Application Ser. No. 07/115,018 will be referred to herein as "Parent 3". It has matured to U.S. Pat. No. 5,386,288.

This application contains some material in common with patent application Ser. No. 07/456,407, now abandoned.

The specifications and drawings of Parents 1, 2 and 3 are incorporated herein as if fully recited herein.

All references cited by the examiners and the applicants in Parents 1, 2, 3, and in the abandoned application are incorporated into the pertinent Information Disclosure Citation of this application.

BACKGROUND OF THE INVENTION

1. Field of the Invention

The field of the invention is ring lasers, more particularly ring laser gyroscopes, including multioscillators, and the methods and apparatus for stimulating ring lasers. Its classification is expected to be in class 356.

2. Description of Related Art

In this description, the terms wavelength, quarter wavelength, half wavelength, and similar words, are measured at the excitation frequency of the ring laser.

Over the past twenty five years the gaseous medium planar ring laser gyroscope has been developed and evolved as a reliable and relatively environmentally insensitive inertial rotation sensor. Planar ring laser gyroscopes of both triangular and square geometries have been used regularly in inertial navigation systems and flight control systems in both commercial and military aircraft. The primary advantage of the ring laser gyroscope over the spinning-wheel mechanical gyroscope is that it can be configured into a truly strapdown system. It can not only have a much larger dynamic range than its mechanical equivalent but also be free of the disadvantages of mechanical bearings. Its ability to withstand relatively large mechanical shock is enhanced without permanently degrading its performance. Because of this and other features, the expected mean time between failures of ring laser gyroscopes in inertial navigation systems is several times longer than the spinning wheel mechanical gyroscopes it replaces.

At low measured rotation rates, the retroscatter from the mirrors of a conventional planar ring laser couples energy from one of the oscillating beams traveling in one direction into the beam propagating in the other direction around the ring laser. The frequencies of the two beams are locked together, yielding zero rotation information. To avoid locking of the frequencies, it is conventional for ring laser gyroscopes having a planar configuration to use mechanical rotational dithering schemes to rock the gyro about its sensitive axis. The information from the gyro can then be processed to avoid the effects of the frequency locking, or "lock-in."

Mechanical dithering is very effective to reduce the effects of lock-in, and it makes the ring laser gyroscope a successful navigation-grade gyroscope. However the mechanical dithering in such a ring laser gyroscope adds a quasi-random noise component to the gyro output signal that limits its performance Additional costly apparatus or techniques are used to minimize the noise produced by the dithering.

For certain military or space borne uses and for systems needing fast updates of position, body or mirror dither cannot be tolerated.

Alternative biasing techniques have been developed using a nonreciprocal Faraday effect created either by placing an axial magnetic field directly in the gain medium of the laser or by placing a solid glass element within the ring laser cavity. The differential phase shift produced between the counterpropagating beams separates their lasing frequencies and shifts their lock-in band to input rates higher than those being measued. An example of this technique, used in a configuration called a multioscillator, may be found in U.S. Pat. No. 4,818,087 entitled, "ORTHOHEDRAL RING LASER GYRO," which issued on Apr. 4, 1989 to Terry A Dorschner.

More recent multioscillator gyroscopes use a nonplanar light path both to force the lasing polarizations to be substantially circularly polarized and to create a frequency difference, known as the reciprocal splitting, between the two polarities of circularly polarized light. The beam pairs of each polarization operate independently without coupling with one another to create two laser gyroscopes operating in the same cavity. When a Faraday elements is added, with a properly applied magnetic field, to the cavity, the frequencies of the counterpropagating beam pairs for both gyros are separated by an equal but opposite amount. The difference of the output beats of the two gyros is substantially independent of the size of the nonreciprocal Faraday bias, and it is doubly sensitive to rotation.

In such a device there are at least four lasing modes having: a left-circularly polarized anticlockwise frequency ($L_a$), a left circularly polarized clockwise frequency ($L_c$), a right-circularly polarized clockwise beam ($R_c$), and a right-circularly polarized anticlockwise beam ($R_a$). The nonreciprocal Faraday splitting between the clockwise and anticlockwise beams is typically of the order of one mega-hertz. At least four mirrors form the ring resonator path which is enclosed with an excited laser medium within a closed ring cavity to cause the four beam modes to lase.

One of the mirrors is semitransparent to allow light to leave the resonator and fall upon a photo detector for signal processing. Demodulator circuitry removes the Faraday bias carrier frequency and leaves a beat signal doubly sensitive to rotation compared with the equivalently sized planar dithered Ring Laser Gyro.

A more modern form of a multioscillator-type ring laser gyroscope is described below in the description of Parent 3.

The published prior art teaches magnetic fields positioned around the ring laser bore to separate the frequencies of multiple laser beams. For example, an article entitled, "Properties of Zeeman Multioscillator Ring Laser Gyro," by V. Sanders, S. Madan, W. Chow and M. Scully, published in the 1979 Proceedings of the IEEE; U.S. Pat. No. 4,213,705 which issued Jul. 22, 1980 to Virgil E. Sanders for a FOUR MODE ZEEMAN LASER GYROSCOPE WITH MINIMUM HOLE BURNING COMPETITION.; and U.S. Pat. No. 4,475,199 which issued Oct. 2, 1984 to Virgil E. Sanders et al. for a ZEEMAN MULTIOSCILLATOR RING LASER GYRO INSENSITIVE TO MAGNETIC FIELD AND DETUNING FREQUENCIES teach a multioscillator non-planar ring laser gyro having counterpropagating right and left circularly polarized ring laser beams. A constant magnetic field, produced by a D.C. coil, is placed around the bore of the ring laser to produce non-reciprocal frequency splitting to separate the frequencies of two of the beams from the frequencies of the other two beams. The magnetic field is a constant field, and it does not excite the laser gas. The devices of those references are energized by electrical discharge, not by electro-magnetic fields.

U.S. Pat. No. 4,616,929 which issued Oct. 14, 1986 to Bernard Bernelin, et al. for a COMPACT, INTEGRAL, 6-MIRROR TRIAXIAL, LASER RATE GYRO teaches an octahedral ring laser gyro which also is energized by electrical discharge between the cathode 14 and three anodes 18, 19 and 20.

An article which appeared on page 132 of Volume 19, Number 5, Sep. 1, 1971, of Applied Physics Letters about a, "Waveguide Gas Laser," by P. W. Smith teaches a linear laser with electrical excitation between an anode and a cathode. Three in-line cross-hatched elements, one of which is grounded, are shown adjacent the laser bore and attached to an, "RF Exciter" The two outer elements are shown energized in phase. The elements and their separation are not mentioned in the article, but they are probably electrodes.

U.S. Pat. No. 3,772,611 which issued Nov. 13, 1973 to P. W. Smith for a, "Waveguide Gas Laser Device," teaches a continuous single coil receiving r.f. energy to excite a ring laser gyro, but the position of the excitation region appears free to wander. Also, being a mirrorless device, there would be considerable scatter and uncontrollable modes produced. This patent does not describe a ring laser gyroscope.

U.S. Pat. No. 3,873,884 which issued Mar. 25, 1975 to F. C. Gabriel for an, "Electrodeless Discharge Lamp and Power Coupler Therefor," teaches that a gas discharge lamp may be excited using an r.f. field. The recitation of "stability" of operation of the Gabriel lamp refers to "reliability" of the lamp, not stability in positioning the excitation region of the lamp.

W. W. Macalpine, et al., in an article published in the December 1959 Proceedings of the IRE describes, "Coaxial Resonators with Helical Inner Conductor," describes certain constructions of r.f. coils.

BRIEF DESCRIPTION OF PARENT APPLICATIONS

The closest art known to the applicants are the Parent applications, still pending.

The split-gain gyroscope of Parent 3 operates across two longitudinal mode groups encompassing eight possible lasing modes. A uniform axial magnetic field is applied to the entire gain region in the cavity light path resulting in a splitting of the overall gain curve into two parts; one part of the gain curve provides gain for modes of one helicity only (La and Rc) while the other part provides gain for modes of the other helicity only (Lc and Ra). If the magnetic field is tuned so that the splitting of the gain curve is substantially equal to the cavity free spectral range, then by suitable minor adjustment of the cavity length the gain curves can be positioned so that only the La and Rc modes from the first longitudinal mode group, and only the Lc and Ra modes from the next logitudinal mode group lase. The lasing modes are the same as those found in the multioscillator configuration which uses a intracavity Faraday element but the split-gain light path has no intracavity elements and the equivalent Faraday nonreciprocal splitting has been increased substantially from the previous typical value of around one mega-hertz to a value equal to the cavity free spectral range. The cavity free spectral range depends on the cavity length but is typically around two giga-hertz.

All of the multioscillator ring laser gyroscope configurations are non-dithered alternatives to the dithered planar ring laser gyroscope or the mechanical gyroscope.

The Split-Gain multioscillator of Parent 3 has the distinct advantage over the Faraday biased multioscillator in that no intra-cavity element (a source of scatter and loss error) is used, and the large frequency splitting or separation between the lasing modes avoids backscatter coupling.

Briefly, the prior art basic multi-oscillator ring laser gyroscope operates with left circularly polarized and right circularly polarized light beams and uses a Faraday effect glass device within the cavity or magnetic field on the gain plasma to provide a phase shift between the counter propagating waves to prevent mode locking. Reflections and backscatter from the intracavity element and instabilities of the magnetic field associated therewith cause difficulties that need to be overcome in order to build a fully optical navigational grade mullti-oscillator ring laser gyroscope.

The split gain gyroscope includes the step of adjusting an axially applied magnetic field at a magnitude that produces a splitting between the gain curve for anti-clockwise left circularly polarized light and clockwise right circularly polarized light and the gain curve for clockwise left circularly polarized light and the anti-clockwise right polarized light that is substantially equal in frequency to a multiple of the free spectral range of the cavity. By delivering an axially directed magnetic field to the gain medium, the lasing action of selected modes of the cavity is suppressed by means of frequency shifting the gain curve centers, preventing frequency locking. While originally designed for use with a D.C. discharge mechanism (for exciting the active gain medium), an R.F. excited gain medium provides a most desirable design.

As taught in Parent 3, radio frequency discharges may be used to excite the gain medium of a split gain gyroscope. gain gyroscope also requires that where a permanent magnet is used to provide an axial magnetic field, a D.C. coil is also needed to fine tune the magnetic field to split the gain curves properly within this multimode ring laser gyroscope. In particular, FIG. 15 of Parent 3 discloses a configuration for achieving radio frequency excitation of a split gain multimode ring laser gyroscope.

In Parent 3, it will be noted that a gyro frame, along one of its frame legs supports a gain medium excitation resonator helical coil, which is wrapped around the frame leg of the gyro frame. Surrounding the helical coil is a resonator shield. The shield may be a cylindrical copper tube open at each end only enough to accommodate positioning along the frame leg of the gyroscope frame. Immediately surrounding and enclosing the resonator shield are D.C. field windings used to fine tune the axial magnetic field which is applied by the permanent magnet to the active gain medium. The design of Parent 3 requires two separate coils, one to carry a D.C. signal and another coil to carry the A.C. excitation signal.

When using a full wavelength or a half wavelength exciting coil, as described in the parent applications, to excite the ring laser, the excitation region experiences no drifts. However, when using such excitation coils, the bore walls attract the gain medium gas atoms which reduces the life of the ring laser.

When a quarter wavelength exciting coil is used to excite the laser of Parent 1 or Parent 2 no loss of the gain medium occur. However, the excitation region excited by the quarter wave coil drifts slightly, and the precision of the gyro, particularly the split gain gyro, is affected by such drift.

The gain medium for a ring laser is usually a gas, and it often is a mixture of helium and neon gases. Parent 1 teaches the use of a means for applying a radio frequency signal to a ring laser for exciting the gain medium. It is excited by wrapping a quarter wave coil, within a resonant cavity, around one portion of the gain medium of the ring laser gas conduit and delivering radio frequency energy to the coil.

Parent 2 teaches combining a constant magnetic field, produced by D.C. current, which is used for frequency splitting of beams in a multioscillator ring laser gyro, with a radio frequency (A.C.) excitation current, on a common coil for delivering radio frequency energy to the ring laser gas in a gain region of the gas. The effects produced by the two currents (A.C. and D.C.) are different. The constant D.C. current provides a stable magnetic field which produces frequency splitting, and the radio frequency (A.C.) current energizes the laser beam.

The ring laser gyro apparatus, especially the apparatus described and claimed in the Parent applications, usually needs to be a precise instrument. Because of the special construction of the apparatus in the parent applications, uncontrolled or unexpected change in physical conditions in the ring laser affects the precision of the gyro. One of the uncontrolled changes in prior art apparatus is the position of the excited plasma in the excitation gain region of the ring laser. For proper operation of the apparatus, with quarter wave excitation coils, in the parent applications, the position of the excited plasma needs to be positioned and held stationary in the laser bore.

BRIEF DESCRIPTION OF THE INVENTION

The invention herein is directed to improvements in the excitation apparatus for a ring laser gyro. These improvements are needed to stabilize the position of the excited plasma in a ring laser gyro, particularly of the types taught in the Parent applications.

Instead of one substantially quarterwave excitation coil, the apparatus of this invention uses two in-line juxtaposed excitation coils, each preferably substantially a quarter wavelength, in the gain region of the gyro. The two excitation coils are wound and excited, substantially at resonance, to cause the electric gradient in the specific region with the laser bore between the adjacent ends of the coils to jump step-wise from one polarity to the opposite polarity, and the steep gradient produced by that step stabilizes the position of the excitation region in the gain region of the gyro.

To cause the electric field to jump, the two excitation coils are either driven oppositely in phase or one of the two coils is inductively driven from the other coil. While the coils are preferably wound oppositely about the gain bore, they operate satisfactorily when wound in the same direction if they produce the jump in the electric field. The produced electric fields within the gain region are of opposite polarities.

In one embodiment of the invention, both coils are actively driven from a radio frequency driving source. In another embodiment, only one of the two coils is driven from the radio frequency driving source, but the inductive coupling between the coils causes the second coil to produce the desired jump in electric field polarity.

It is therefore a feature and object of this invention to stabilize the position, within a gaseous medium, of the excitation region of an electromagnetically driven laser, by using two substantially quarter wavelength coils surrounding the bore of the ring laser. This feature is especially useful for the Split Gain Multioscillator Ring Laser Gyroscope.

It is also a feature and object of this invention to stabilize such region wherein said gaseous medium is within a laser gain bore.

It is another feature and object of the invention to stabilize such region in the gain bore of a ring laser.

It is likewise a feature and object of the invention to stabilize such region in a ring laser gyro.

It is a more particular feature and object of the invention to stabilize such region in a ring laser gyro multioscillator, and particularly wherein the laser path is non-planar.

It is still a more specific object and feature of the invention to excite a ring laser using at least two adjacent substantially quarter wavelength radio frequency coils, positioned around the gain bore of a ring laser, and driving them at substantially their resonance frequency.

Other features and objects of the invention will become apparent from the following description, taken with the accompanying drawings.

DESCRIPTION OF THE PREFERRED EMBODIMENT

Figure 1:
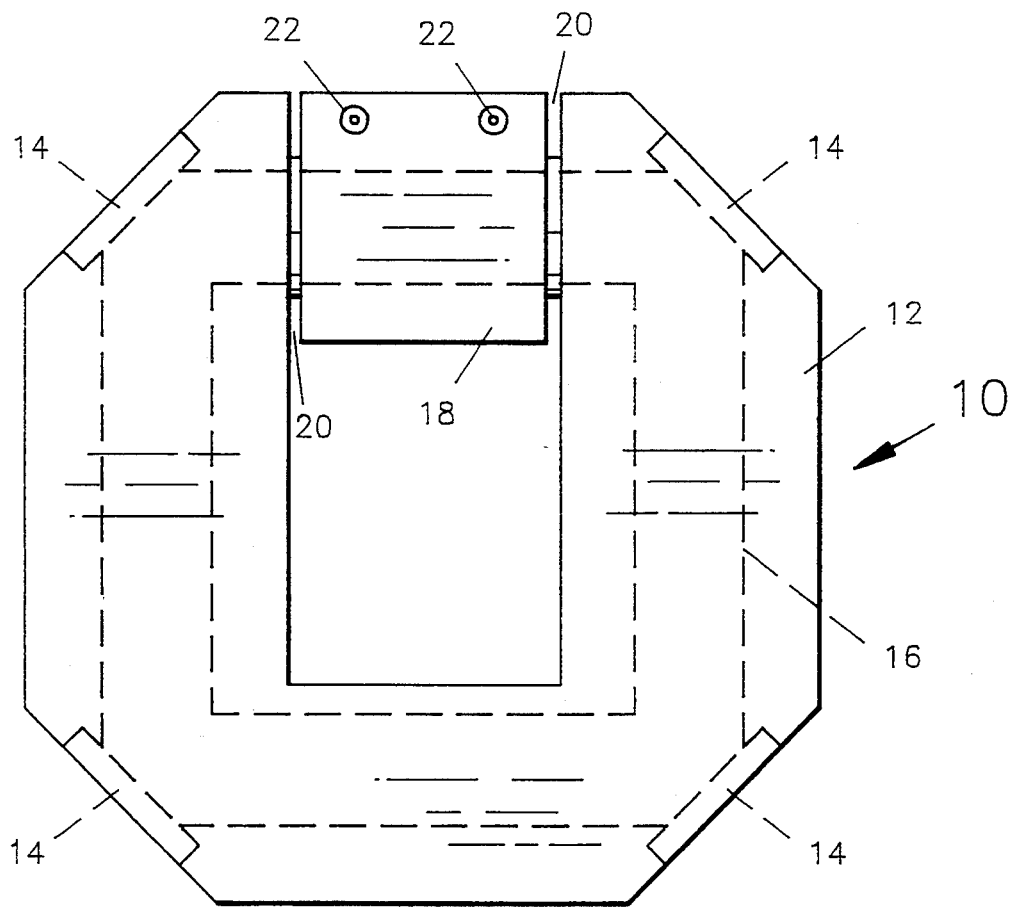
FIG. 1 is a plan view of a ring laser with the position of the exciting r.f. coils shown.
Figure 2:
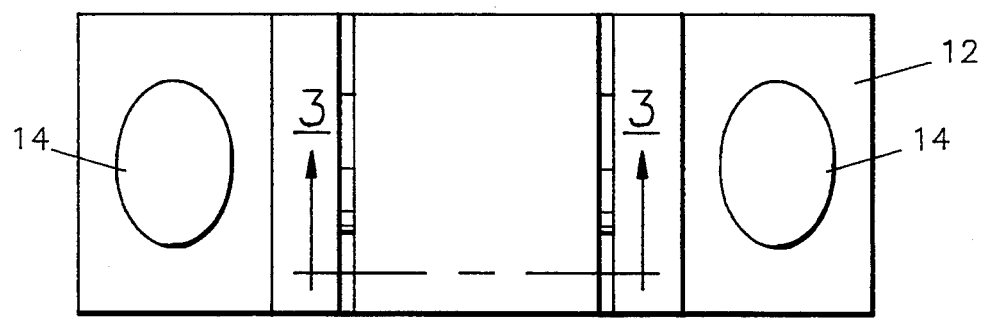
FIG. 2 is a view, taken from the top of FIG. 1.

In FIGS. 1 and 2, a ring laser 20 is embedded in a solid block 12 with corner mirrors 14 forming the laser path within the laser bore 16. Although the path is shown as a planar path, the apparatus of this invention is particularly useful where the laser ring is not planar(not shown). One leg of the bore 16, called the gain bore contains a gain region which is enclosed by the two coils of the invention. The two coils are preferably in an electrically shielded housing 18.

Figure 3:
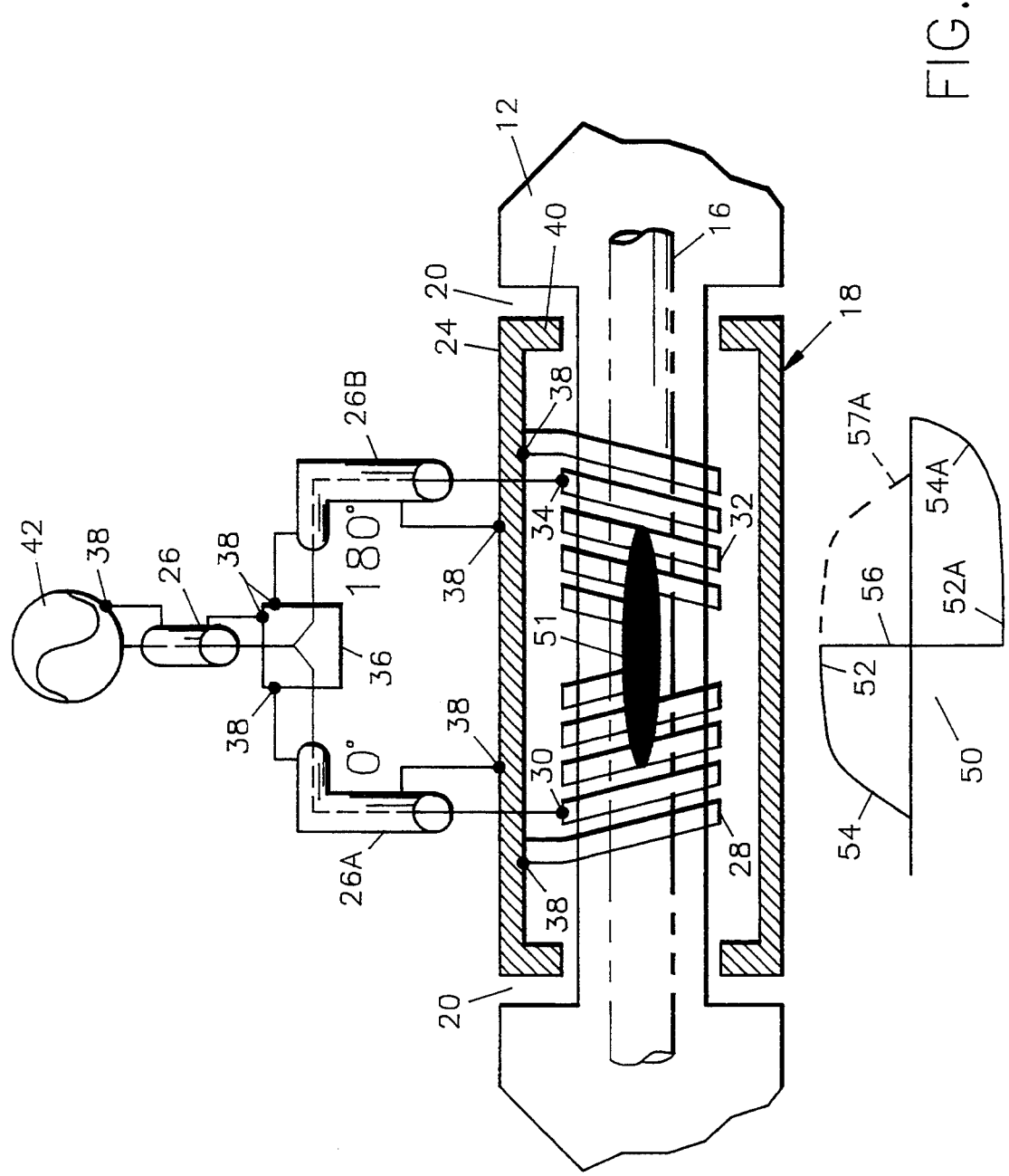
FIG. 3 is a partly diagrammatic broken-away view of a preferred embodiment of the invention in which both coils are driven in phase opposition.
Figure 4:
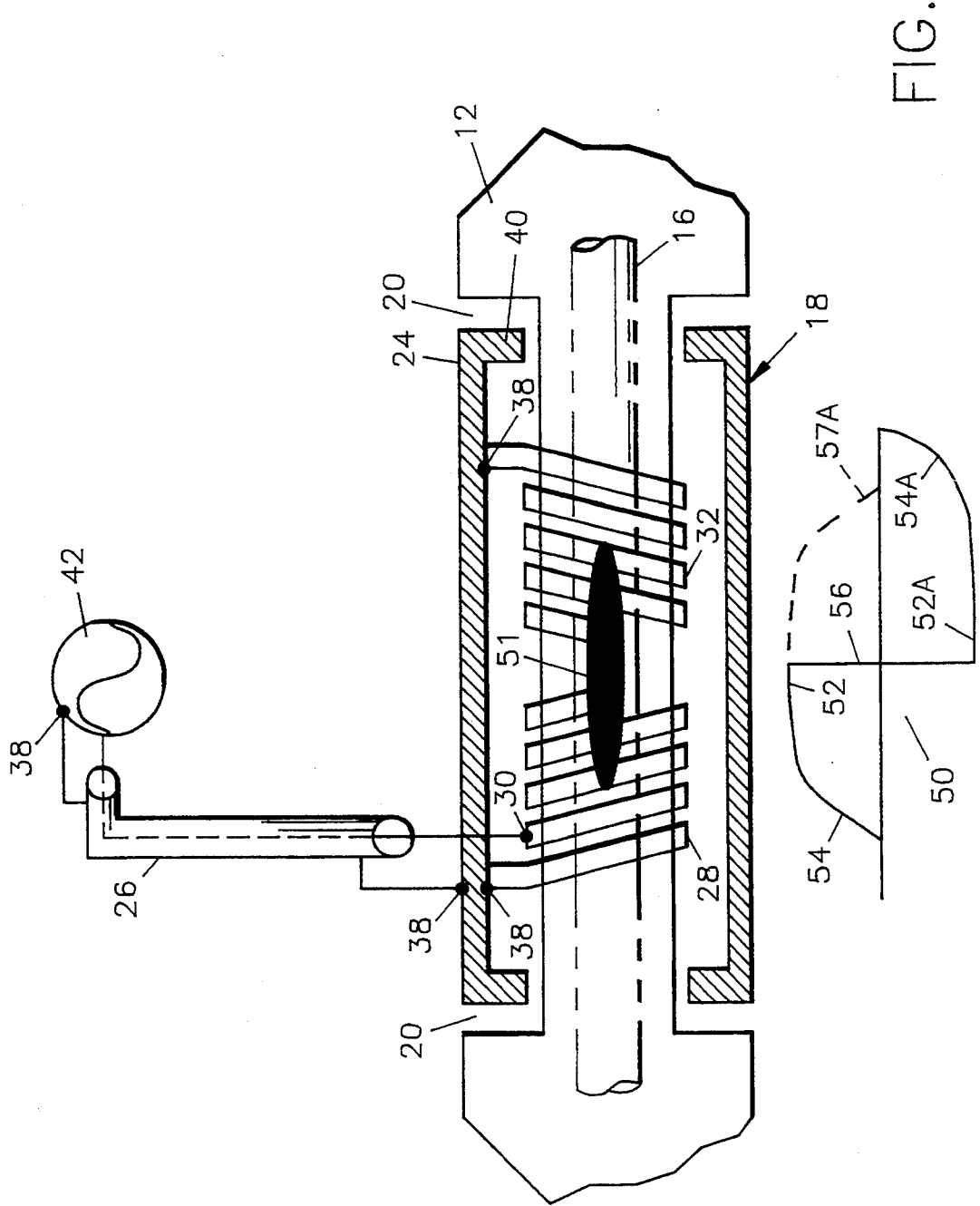
FIG. 4 is a partly diagrammatic broken-away view of an alternative form of the invention in which the second excitation coil is excited from a first excitation coil.

In the embodiment of FIG. 3, two ports 22 (shown in FIG. 1) in the housing 18 receive radio frequency energy. In the embodiment of FIG. 4 there is only one port 22. Preferably, the electrical shield housing 18 is spaced apart, at 20, from the remainder of the housing 12, and it is made of electrically conductive material.

FIG. 3 and 4 are views, taken at 3—3 in FIG. 2, of the substantially quarter wave coils 28 and 32 within the housing 18, showing their position and their electrical connections.

In FIG. 3, coils 28 and 32 are driven in phase opposition from a radio frequency source 42 through a coaxial line 26, thence through a signal splitter and phase inverter 36, thence through coaxial lines 26A and 26B, respectively. The position of the taps 30 and 34 are chosen to match the impedance of the transmission lines 26A and 26B.

Oppositely driven coils 28 and 32 are preferably, but not necessarily, oppositely wound. The combination of the direction of winding and the phases of the driving signals produce oppositely poled electromagnetic fields in the region 51 of the bore 16.

The distal ends of the quarterwave coils 28 and 32 are grounded. The windings are further characterized by the two quarterwave coils 28 and 32 being fed opposite in appropriate phase, depending upon their direction of winding, from opposite ends at taps 30 and 34.

The excited electric plasma within the bore 16 migrates to a position of maximum electric field gradient. Plots of the electric field intensity as a function of position along the bore are shown at 50.

Without the second coil, the electrical field intensity plot would follow the curve 54-52-57A, and the position of the excitation region 51 would either be at 54 or 57A. However, with the two oppositely poled coils, the field intensity follows the curve 54-52-56-52A-54A. Note that the maximum field gradient always occurs at 56, and the excited plasma at the excitation region 51 is anchored in position at 56. The stable position of the excitation region 51 contributes to increased accuracy of the ring laser gyro.

The apparatus of FIG. 4 differs from that of FIG. 3. Only the coil 28 is excited by the radio frequency source 42. Voltage is induced from coil 28 into coil 32, and the radio frequency electric field 54-54A is proued and positioned in the excitation region 51 of the bore 16.

Either embodiment may be used in holding the position of the gain region 51.

Coverage of the invention extends beyond the specific shown embodiments. The electric shield 18 contributes to the directing or focussing of the electric portion of the electro-magnetic field into the desired region of the laser gas.

Although its preferred use is in a four-branched ring laser of the kind described in Parent 1 and Parent 2, the apparatus should not be limited to a ring laser with exactly four branches. For example, some ring laser gyros use a three branched ring laser, and the gain region is in one of the branches.

Further, although the invention was conceived for use in the ring laser gyro of the Parent applications, the invention is not limited to use in ring lasers. If desired, lineal lasers may be energized in this fashion.

Likewise, there may be other instances wherein it is desired to position a high intensity electric component of a radio frequency field using substantially quarterwave coils.

This invention is intended to dominate the use of the claimed coil configuration and excitation in other unshown apparatus, whether the apparatus uses a gas or not, wherein it is desired to produce a region of high intensity electric gradient of a radio frequency wave.

To recapitulate, where a substantially quarterwave length coil is driven to produce a high intensity electric component of a radio frequency wave in a predetermined position, this invention contemplates the use of another adjacent substantially quarterwave length coil which is driven and wound relative to its adjacent coil, or which receives its energy from the first coil, to produce a large electric field gradient in the desired region of the adjacent ends of the two coils. It is preferably used to stabilize the position of the excited plasma of a ring laser gyro within the gain region of the laser gas.

An experimental model of the apparatus of the invention has operated continuously for over two years, and it has maintained a stable position of the excited gas plasma within the laser bore.

We claim:

1. A ring laser gyro comprising:
   a ring laser housing;
   at least three mirrors defining a closed ring laser path;
   a bore for said path in said housing, having branches between adjacent mirrors, at least one of said branches having a gaseous gain region;
   a source of radio frequency energy;
   two adjacent coils surrounding said bore in said gain region, each said coil having a length substantially a quarter wavelength at the frequency of said source of radio freuency energy, with at least one of said coils being connected to receive radio frequency energy from said source of radio frequency energy for energizing said laser,
   the adjacent ends of said two coils being predeterminedly closely spaced and in a predetermined position along said gain region to produce an electric field gradient in said gaseous gain region to stabilize the position of the radio frequency electromagnetic excitation of gas plasma in said region between the adjacent ends of said coils.

2. Apparatus as recited in claim 1 wherein said laser path is non-planar and has at least four branches, one of which contains the gain region of said laser.

3. Apparatus as recited in claim 2 in which said coils are substantially in-line and juxtaposed.

4. The apparataus recited in claim 2 wherein radio frequency energy is delivered from said radio frequency source to said coils to cause said coils to produce electric fields which are in phase opposition in the region between the adjacent ends of said two coils.

5. Apparatus as recited in claim 4 wherein said coils are substantially in-line and juxtaposed, and the maximum gradient of the electric field is positioned within the gain region between the adjacent ends of the two coils.

6. The apparatus recited in claim 5 and further comprising an electric shield surrounding said coils.

7. The apparatus recited in claim 5 wherein radio frequency energy is delivered in phase opposition by two transmission lines to taps which are predeterminedly positioned on said coils, respectively, to cause the impedances of said coils at said taps to match the impedances of said transmission lines; and wherein radio frequency electro-magnetic signals in said coils are in phase opposition to produce a sufficiently high field gradient between the adjacent ends of said coils to stabilize the position along said bore of the excited plasma region of the gas of said laser.

8. The apparatus recited in claim 7 and further comprising an electric shield surrounding said coils.

9. The apparatus recited in claim 5 wherein radio frequency energy is delivered by transmission line to a tap predeterminedly positioned on one of said coils to cause the impedance of the coil at said tap to match the impedance of said transmission line; and wherein radio frequency electro-magnetic signals induced from said tapped coil into said other coil are in phase opposition to the signals in said inducing coil to produce a sufficiently high electrical field gradient between the adjacent ends of said coils to stabilize, within said gain region, the excited gas plasma of said laser.

10. The apparatus recited in claim 10 and further comprising an electric shield surrounding said coils.

11. The apparatus recited in claim 5 wherein said ring laser gyro is a non-planar split gain gyro.

12. In combination:
a source of radio frequency energy;
two juxtaposed coils whose axes are substantially aligned with a predetermined axis which is within a gas, each said coil having a length substantially a quarter wavelength at the frequency of said source of radio frequency energy, the adjacent ends of said two coils being predeterminedly spaced along said axis to stabilize the position within said gas of the radio frequency electro-magnetic plasma excitation region of said gas.

13. The apparatus recited in claim 12 wherein radio frequency energy is delivered from said radio frequency source to said coils to cause said coils to produce electric fields which are in phase opposition in said plasma at the adjacent ends of said two coils.

14. The appartus recited in claim 13 and further comprising an electric shield surrounding said coils.

15. The apparatus recited in claim 13 wherein radio frequency energy is delivered in phase opposition by two transmission lines to taps which are positioned on said coils, respectively, to cause the impedances of said coils at said taps to match the impedances of the transmission lines; and wherein signals in said coils are in phase opposition to produce an electrical field gradient within the laser gas between the adjacent ends of said coils.

16. The apparatus recited in claim 15 and further comprising an electric shield surrounding said coils.

17. The apparatus recited in claim 13 wherein radio frequency energy is delivered by transmission line to a tap positioned on one of said coils to cause the immpedance of said coil at said tap to match the impedance of said transmission line; and wherein signals induced from said tapped coil into the other said coil are in phase opposition to the signals in the inducing coil to produce a sufficiently an electrical field gradient within the gas between the adjacent ends of said coils to stabilize the plasma excitation position.

18. The apparatus recited in claim 17 and further comprising an electric shield surrounding said coils.

19. Apparatus for stabilizing the position of the exciting electric component of a radio frequency electromagnetic field within the excited plasma of a gas, comprising:
two juxtaposed, aligned quarterwave coils surrounding a region of said gas for exciting said gas plasma;
a source of exciting radio frequency energy;
said quarterwave coils having their adjacent ends open and at least one said coil being driven from its distal end by said radio frequency source to ensure that the adjacent open ends of the two coils have electric field components that produce a gradient of electric field within the gas plasma between said open ends to stabilize the position of said gas plasma.

20. Apparatus as recited in claim 19 in which said gas plasma is within the gain region of a split gain ring laser gyro.

* * * * *